(12) United States Patent
Ransdell et al.

(10) Patent No.: US 10,529,383 B2
(45) Date of Patent: Jan. 7, 2020

(54) METHODS AND SYSTEMS FOR PROCESSING SYNCHRONOUS DATA TRACKS IN A MEDIA EDITING SYSTEM

(71) Applicant: Avid Technology, Inc., Burlington, MA (US)

(72) Inventors: Thomas R. Ransdell, Chelmsford, MA (US); Michael D. Laird, Nashua, NH (US); Ronald C. Wallace, Lexington, MA (US)

(73) Assignee: AVID Technology, Inc., Burlington, MA (US)

( * ) Notice: Subject to any disclaimer, the term of this patent is extended or adjusted under 35 U.S.C. 154(b) by 89 days.

(21) Appl. No.: 15/090,695

(22) Filed: Apr. 5, 2016

(65) Prior Publication Data

US 2016/0300596 A1    Oct. 13, 2016

Related U.S. Application Data

(60) Provisional application No. 62/145,453, filed on Apr. 9, 2015.

(51) Int. Cl.
*G11B 27/32* (2006.01)
*G11B 27/031* (2006.01)
*G11B 27/34* (2006.01)

(52) U.S. Cl.
CPC .......... *G11B 27/323* (2013.01); *G11B 27/031* (2013.01); *G11B 27/34* (2013.01)

(58) Field of Classification Search
CPC ..... G11B 27/031; G11B 27/323; G11B 27/34; G11B 27/00

USPC ........ 386/230, 244, 278–290, 241; 345/629; 715/203, 723; 717/110
See application file for complete search history.

(56) References Cited

U.S. PATENT DOCUMENTS

| | | | |
|---|---|---|---|
| 6,404,978 B1 * | 6/2002 | Abe ................... | G11B 27/034 386/230 |
| 7,725,812 B1 | 5/2010 | Balkus et al. | |
| 7,930,624 B2 | 4/2011 | Phillips et al. | |
| 8,205,148 B1 * | 6/2012 | Sharpe ............... | G11B 27/034 715/203 |
| 8,559,793 B2 | 10/2013 | Wallace | |
| 8,818,173 B2 | 8/2014 | Wallace | |
| 9,525,896 B2 * | 12/2016 | Rayter ............... | H04N 21/8549 |
| 9,548,082 B1 * | 1/2017 | Bussieres .......... | H04N 5/76 |

(Continued)

*Primary Examiner* — Thai Q Tran
*Assistant Examiner* — Stephen R Smith
(74) *Attorney, Agent, or Firm* — Oliver Strimpel (57) ABSTRACT

A software architecture and framework based on plug-in software modules supports flexible handling of synchronous data streams by media production and editing applications. Plug-ins called by the applications convert data from synchronous data streams into a form that enables a user of such an application to view and edit time-synchronous data contained within such data streams. The synchronous data is displayed in a temporally aligned manner in a synchronous data track within a timeline display of the application user interface. In one example, closed caption data extracted from the ancillary portion of a video signal is displayed as text on a data track temporally synchronized with the source video track. Other plug-ins analyze media tracks to generate time-synchronous data which may also be displayed in a temporally aligned manner within a synchronous data track in a timeline.

21 Claims, 9 Drawing Sheets

(56) References Cited

U.S. PATENT DOCUMENTS

| | | | | |
|---|---|---|---|---|
| 9,961,403 B2* | 5/2018 | Kritt | ................. | G06F 3/0484 |
| 2006/0224940 A1* | 10/2006 | Lee | ................. | G11B 27/034 |
| | | | | 715/203 |
| 2007/0292106 A1* | 12/2007 | Finkelstein | ............ | G11B 27/28 |
| | | | | 386/241 |
| 2010/0223128 A1* | 9/2010 | Dukellis | ............ | G06Q 30/0253 |
| | | | | 705/14.51 |
| 2011/0154290 A1* | 6/2011 | Kelly | ................. | G06F 9/44505 |
| | | | | 717/110 |
| 2012/0014673 A1* | 1/2012 | O'Dwyer | ............ | G06F 3/0346 |
| | | | | 386/282 |
| 2012/0042251 A1* | 2/2012 | Rodriguez | ........... | G11B 27/034 |
| | | | | 715/723 |
| 2012/0139940 A1* | 6/2012 | Chavanne | ........ | G06F 17/30861 |
| | | | | 345/629 |
| 2012/0210227 A1* | 8/2012 | Lin | ................. | G11B 27/034 |
| | | | | 715/723 |
| 2013/0125000 A1* | 5/2013 | Fleischhauer | ........ | G11B 27/031 |
| | | | | 715/723 |
| 2014/0044413 A1* | 2/2014 | Wallace | ............ | H04N 9/8205 |
| | | | | 386/278 |
| 2014/0122485 A1* | 5/2014 | Shyamsundar | ... | G06F 17/30286 |
| | | | | 707/737 |
| 2014/0201631 A1* | 7/2014 | Pornprasitsakul | .... | G06F 3/0484 |
| | | | | 715/716 |
| 2016/0119658 A1* | 4/2016 | Kamphenkel | ...... | H04N 21/4312 |
| | | | | 725/32 |

* cited by examiner

METHODS AND SYSTEMS FOR PROCESSING SYNCHRONOUS DATA TRACKS IN A MEDIA EDITING SYSTEM

CROSS REFERENCE TO RELATED APPLICATION

This application claims right of priority to and the benefit under 35 U.S.C. § 119(e) of U.S. provisional patent application Ser. No. 62/145,453, filed Apr. 9, 2015, which is incorporated herein by reference.

BACKGROUND

In systems for editing and producing time-based media projects that include video and audio, it is often useful to manipulate various kinds of data that pertain to the video and audio, but that are not themselves time-based media. Examples of such data and metadata may include: descriptive metadata, such as information about the people involved in a production, the location where video was shot or audio was recorded, and the date when the media was captured; and structural metadata, such as image format/type (e.g., HD, SD), aspect ratio, and bit rate. In contrast to such descriptive and structural metadata, which are not time-based, an increasing range of data is being generated in the form of data streams that are time-synchronized with the audio and video content. Such time-based data are distinct from the audio and video portions of a media project, and represent additional time-based information pertaining to the production and/or subject matter of the media project.

In existing media editing and production systems, time-synchronous data are usually embedded within an audio or video signal. In digital video broadcasts, the data is often placed in the ancillary portion of the signal. In file-based media, such as those generated by cameras, disk recorders, video servers, and other video or audio acquisition and playback devices, the data are present in various forms within the media files, often as embedded portions of the video frames.

Such schemes for handling time-synchronous data streams limit the ability of editors to view, edit or otherwise manipulate the data streams independently of the picture and audio tracks. There is a need to provide a software architecture and framework to support the development of tools for manipulating synchronous data streams within the context of a real-time, multi-track, non-linear editing production system.

SUMMARY

In general, the methods, systems, and computer program products described herein enable media editor to view and edit time-synchronous data in conjunction with the time-based media of a media composition project. Time-synchronous data obtained from synchronized data streams, such as ancillary data streams from video signals, is displayed in a data track within an editing application timeline in temporal alignment with the projects time-based media tracks.

In general, in one aspect, a method of processing a time-synchronous data stream associated with a time-based media project comprises reading the time-synchronous data stream into a media processing application; from the media processing application, calling a software plug-in module; enabling the software plug-in module to access and process the time-synchronous data stream, the processing comprising converting the time-synchronous data stream into a time-synchronous data track that is readable by the media processing application; displaying the synchronous data track within a timeline representation of the time-based media project within a graphical user interface of the media processing application, the time-based data track including a temporally aligned display of data from the data stream such that a representation of data associated with a given temporal location within the time-synchronous data stream is displayed in the synchronous data track timeline representation at a spatial location corresponding to the given temporal location.

Various embodiments include one or more of the following features. The time-synchronous data stream was extracted from an ancillary portion of a digital video broadcast signal. The ancillary data stream includes timecode data and the representation of ancillary data in the synchronous data track timeline representation includes a numerical timecode. The ancillary data stream includes GPS data and the representation of ancillary data in the synchronous data track timeline representation includes an indication of a change in GPS coordinates between a first temporal location and a second temporal location within the time-synchronous data stream. The ancillary data stream includes at least one of a text and a graphical station identifier and the representation of ancillary data in the synchronous data track timeline representation includes a text or a graphical indication of the at least one of a text and a graphical station identifier. The time-synchronous data stream includes closed caption data. The representation of the closed caption data includes closed caption text. The closed caption text is searchable. The representation of the closed caption data includes: an indication of a temporal location at which a display of a given closed caption is to be turned off during playback of the time-based media project; and an indication of a temporal location at which a closed caption subsequent to the given closed caption is to be turned on during playback of the time-based media project. The representation of the closed caption data includes an indication of a plurality of closed caption loading phases corresponding to temporal spans within the time-synchronous data stream during which closed caption data is present. The method of processing a time-synchronous data stream includes displaying a broken caption warning within the timeline representation of the synchronous data track when a user of the media processing application performs an editing operation at a temporal location in the time-based media project that spans a temporal location within the time-synchronous data stream during which closed caption data is present in the time-synchronous data stream. The method includes exporting from the media processing application closed caption text obtained from the closed caption data.

In general, in another aspect, a method of processing a time-based media track associated with a time-based media project comprises: reading the time-based media track into a media processing application; from the media processing application, calling a software plug-in module; enabling the software plug-in module to access and analyze the time-based media track to generate time-based analysis results; generating a time-synchronous data track comprising time-synchronous analysis results; and displaying the time-synchronous data track within a timeline representation of the time-based media project within a graphical user interface of the media processing application, the time-based data track including a temporally aligned display of the time-synchronous analysis results such that a representation of time-synchronous analysis results associated with a given temporal location within the time-based media track is displayed in the synchronous data track timeline representation at a spatial location corresponding to the given temporal location.

Various embodiments include one or more of the following features. Analyzing the time-based media track includes detecting motion within a video track to generate motion vectors. Analyzing the time-based media track includes analyzing a speech audio track generating at least one of phonemes and text. Analyzing the time-based media track includes detecting and identifying faces within a video track. Analyzing the time-based media track includes assessing a technical quality of the time-based media track, and evaluating the technical quality of the time-based media track. Analyzing the time-based media track includes identifying ambient sounds within a sound track and using the results of the analysis to detect the location in which the time-based media track was captured. Analyzing the time-based media track includes identifying features within a pictured scene in a video track and using the results to determine a location in which the time media track was captured.

DETAILED DESCRIPTION

Time-based data pertaining to media projects are becoming an increasingly important aspect of all but the simplest media projects. Such time-based data includes descriptive, structural, and enhancement data temporally synchronized to the media to which they pertain. We refer to such data as synchronized or time-synchronous data. Examples of such data include but are not limited to: closed and open captions; subtitles; teletext; film metadata, such as edgecodes, keycodes, and pull-down flags; timecodes; camera data, such as position, zoom, iris, and gain; location data, such as GPS coordinates; program description; 3D stereo parameters; aspect ratio conformance, such as Advanced Format Descriptor; and interactive television programming. Audio-specific examples include: gain, pan, and mixing parameters; MIDI data; and audio timecodes. Methods and systems for editing of video programs with enhancement data are described in U.S. Pat. No. 7,930,624, entitled Editing Time-Based Media with Enhanced Content, which is incorporated herein by reference. Synchronous data tracks within the context of media editing and production systems are described in U.S. Pat. Nos. 8,559,793 and 8,818,173, which are wholly incorporated herein by reference.

Editors and producers need a flexible framework for working with synchronous data using their media editing and production applications. Hitherto, the editing and playback of synchronous data tracks with the kind of flexibility traditionally associated with the editing of media tracks has been achieved only by making modifications to the editing and production applications required to add the desired functionality. For each function involving a synchronous data track, such as a specific type of combination of a data track with a media track, a corresponding modification to the media editing and production application was needed, typically in the form of a revision of the application by the application's provider. Such a process lacks the flexibility and responsiveness that is expected in fast-paced media project development environments. Not only do all changes need to funnel through the manufacturer of the application, which can introduce delay, but the changes may be cumbersome to implement, or even impossible to create within the application itself.

We describe herein a plug-in based software architecture and framework for the flexible and efficient development and distribution of added functionality involving synchronous data tracks within the context of a media editing and production environment. The framework obviates the need to modify the media editing applications for each new processing function and/or new data type. Synchronous data is processed by software modules written as modular plug-ins. The plug-ins may be created and added dynamically to a media processing engine, for example within a non-linear video editing application. Unlike traditional plug-ins and the media engine that supports them, they are not limited to the processing of video or audio, but may process any combination of video, audio, and data. The flexible plug-in framework provides agility in working with the plethora of new synchronous data formats as they arise. The plug-in framework may also provide a standard application program interface (API) that enables plug-ins to be developed by any party, rather than being restricted to the provider of the editing application. The media editing application provider and plug-in developers define the types or classes of plug-ins with the required APIs, and associate protocols to accomplish the required and future workflows.

The separation of the synchronous data track software modules from the host media editing and production application itself decouples the location of the plug-in from that of the application. Thus the plug-in may be hosted remotely from the application. In addition, the plug-in modules may readily be shared and sold from a cloud-based marketplace.

Figure 1:
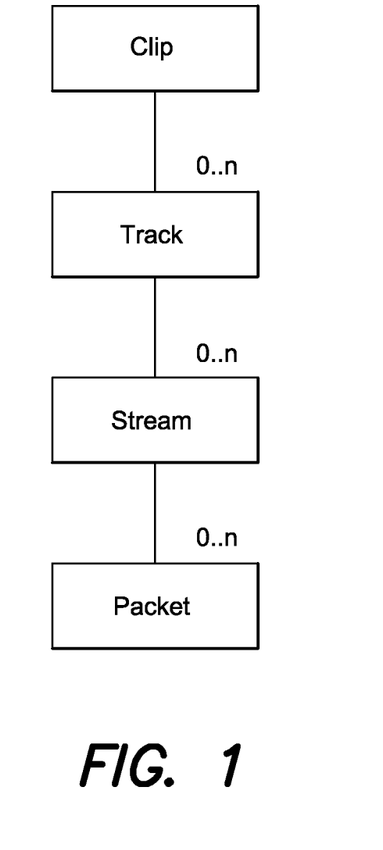
FIG. 1 shows a hierarchy of media data structures.
Figure 2:
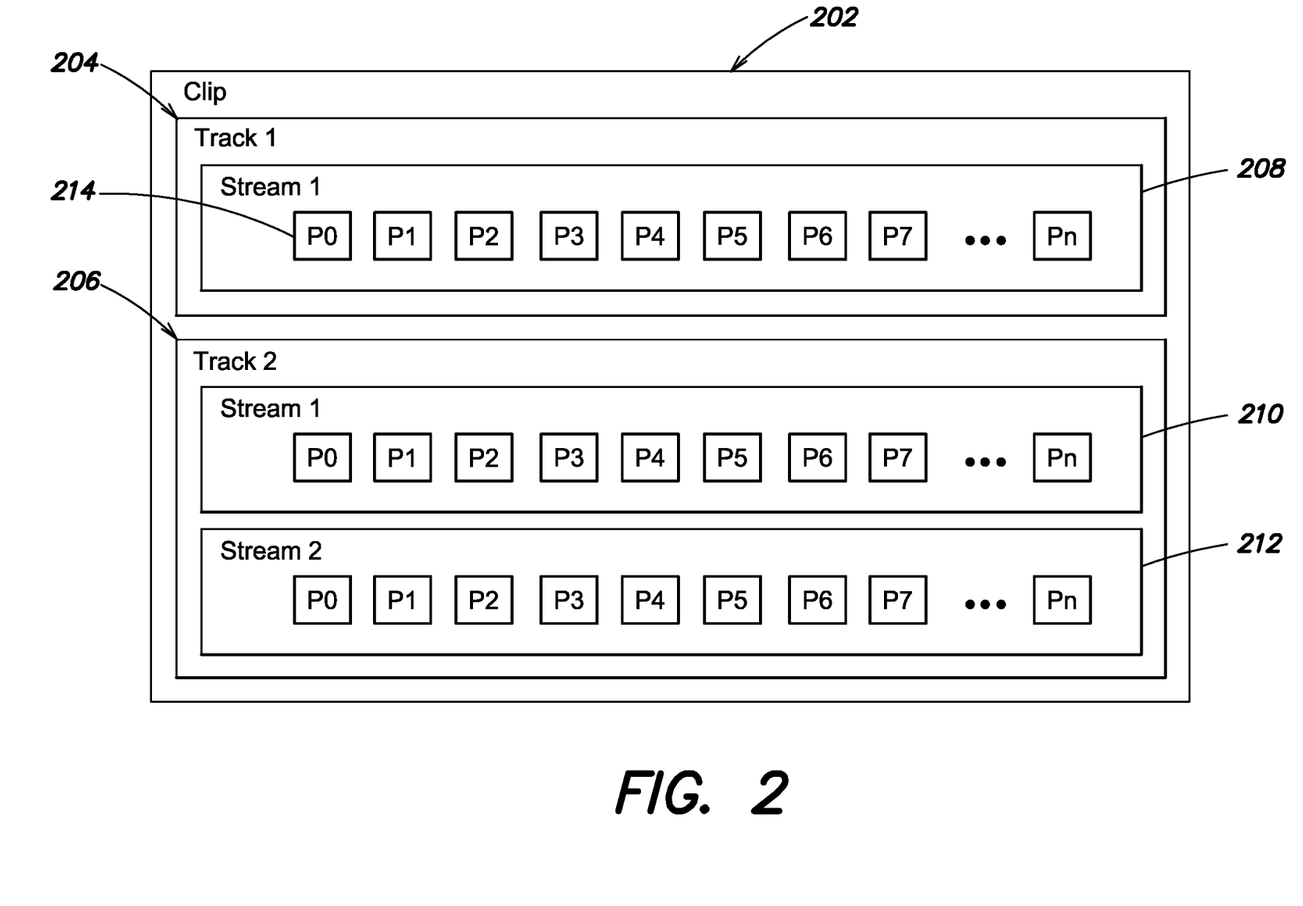
FIG. 2 shows a data hierarchy for a clip that includes data tracks.
Figure 3:
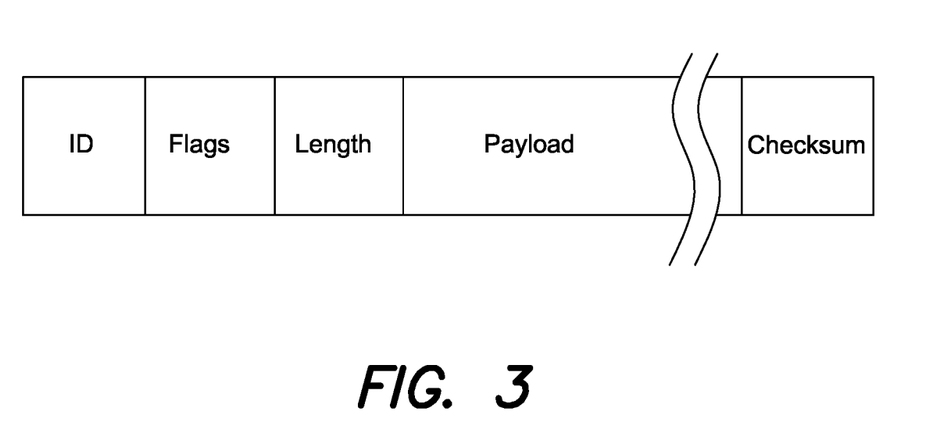
FIG. 3 is a diagram of a data packet format.

Time-synchronous data are organized into a hierarchy of data structures including clips, tracks, streams, and packets, as shown in FIG. 1. An example of the relationship between these elements is illustrated in FIG. 2. The figure shows single clip 202 containing two data tracks 204, 206. Track 204 contains one stream of data packets 208, and track 206 contains two streams 210, 212 of data packets, such as packet 214. In some schemes, a packet corresponds to an individual video or audio sample, and in others there can be many packets for each video or audio sample. The format of a packet is illustrated in FIG. 3. The ID includes an identifier of the type of data contained within the PAYLOAD portion of the packet. The length in bytes of the PAYLOAD portion is determined by the LENGTH field. FLAGS indicate if the data is located in a video ancillary data signal, and if it is, in what portion of the signal. CHECKSUM is a value computed from all of the bytes in the packet except the CHECKSUM field itself, and is used to verify the data integrity of the packet.

Figure 4:
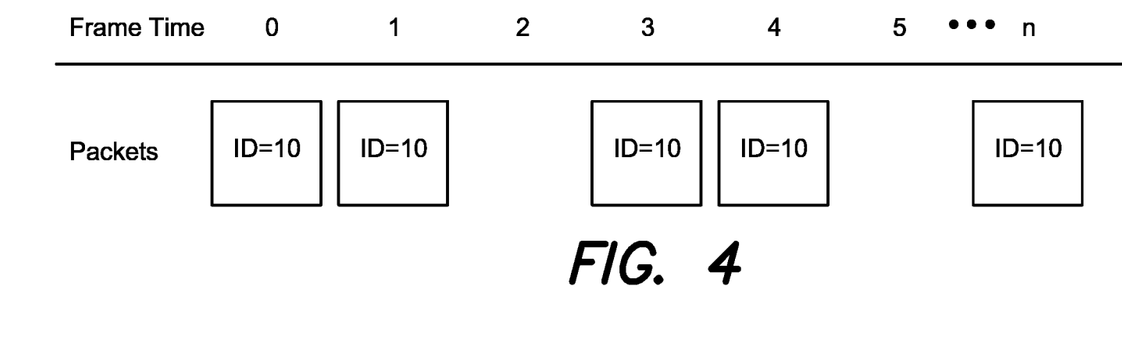
FIG. 4 illustrates a sparse data packet stream.

Data packets are organized into streams, as indicated in FIGS. 1 and 2, each stream including only a single type of packet, i.e., corresponding to a single synchronous data type. Within each stream, each packet occupies a unique time address, which corresponds to a time interval of a video frame or audio sample. However it is not necessary for each frame address in the range of frames in the content to be assigned a packet in the stream, as shown, for example, in the sparse stream illustrated in FIG. 4. Since each of the packets in the stream represents only one data type, they are all given the same ID values.

Figure 5:
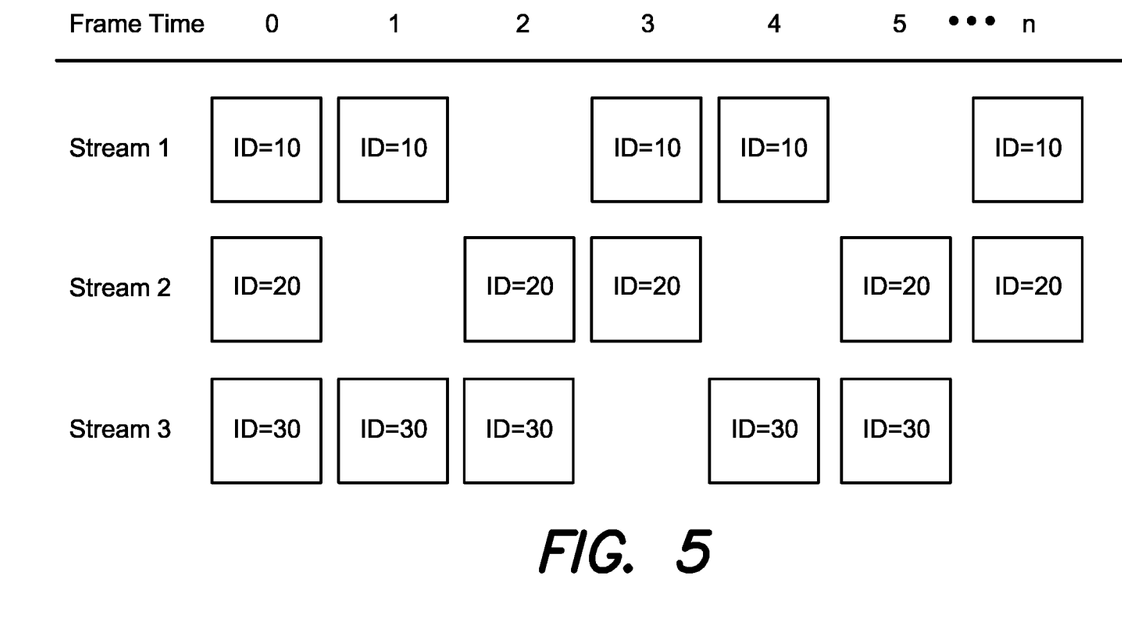
FIG. 5 illustrates a data track with three logical streams.

One or more streams are organized into tracks, as shown in FIG. 2, in which each stream has the same time length, and each track includes no more than one stream of a given type (ID). FIG. 5 illustrates a track containing three streams. The number of streams in a track is limited by the total number of different ID type values, since a given type of stream may only appear once within a given track. The stream data for a track is typically stored in a separate file. The track data structure contains a reference to this file.

Figure 6:
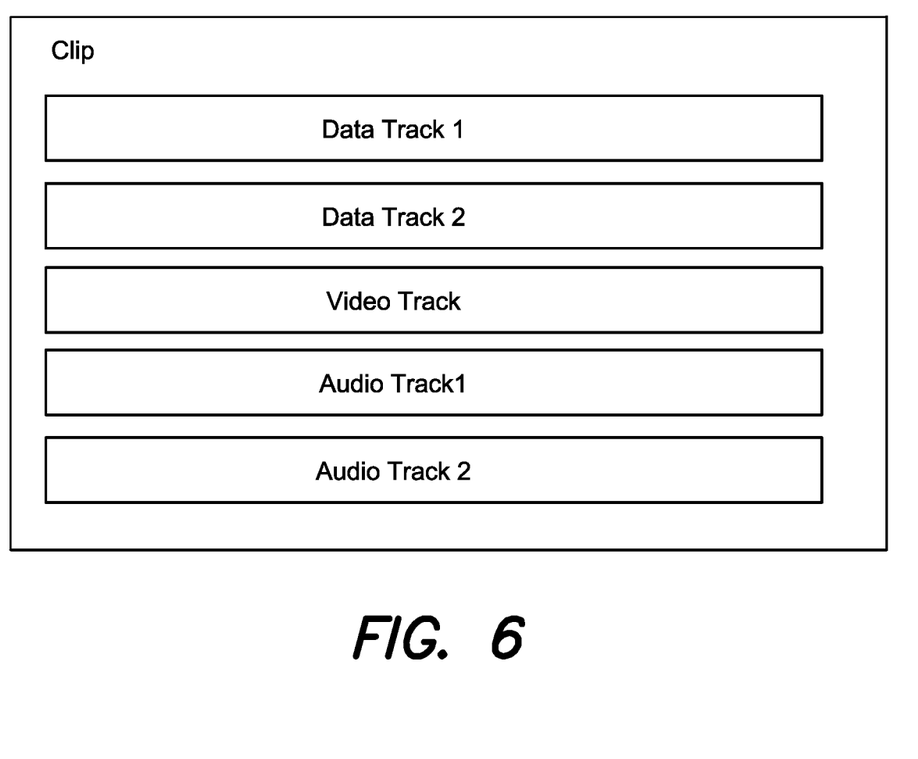
FIG. 6 is a diagrammatic representation of a clip with two data tracks, one video track, and two audio tracks.

Multiple data tracks are assembled into clips, with each track having the same duration and starting time address. Video and/or audio tracks are included in the clips, and the clip structure ensures that data streams are synchronized with each other and with audio and video content. FIG. 6 illustrates a clip with two data tracks, one video track, and two audio tracks. In FIGS. 2 and 4-6, the temporal location within each track is indicated by the position along the horizontal (x) axis, with time increasing towards the right as is conventional in horizontally disposed timelines.

Multiple clips are further arranged in a desired order into a sequence. In a sequence, any portion of a data track or data stream (accurate to a video frame time or an audio sample) may be selected and inserted. This enables the user of a digital media production system to alter the order and timing of the data in clips to create a new order and timing.

The plug-ins may adhere to cross-platform software architecture, such as AVX from Avid Technology, Inc., which is layered over a base plug-in framework called Avid Component Framework (ACF). The ACF is composed of a plug-in host and associated dynamically loaded plug-in modules that expose one or more components that can be created through a common abstract factory mechanism. Each created component supports one or more abstract interfaces that can be queried at runtime to determine versioning and capabilities. ACF uses a pure abstract interface for the API, which separates the interface from the specific implementation. This provides a stable application binary interface (ABI), allowing the host application and plug-ins, including plug-ins from external third-party developers, to use any version of build tools and runtime libraries appropriate for the target operating system. ACF component types define a component that implements one or more abstract interfaces. Examples of component types include AVX components used for video effects that produce new video from one or more inputs, codecs for decoding and encoding video frames, and AAX audio effects for processing audio tracks.

The plug-ins may operate in a real-time fashion, such that the processing and/or analyzing they perform and output is synchronized with playback at a given frame rate, such as 30 or 60 frames per second. Certain plug-ins may operate faster than playback speeds, even in some cases reaching thousands of time normal playback rates.

Figure 7:
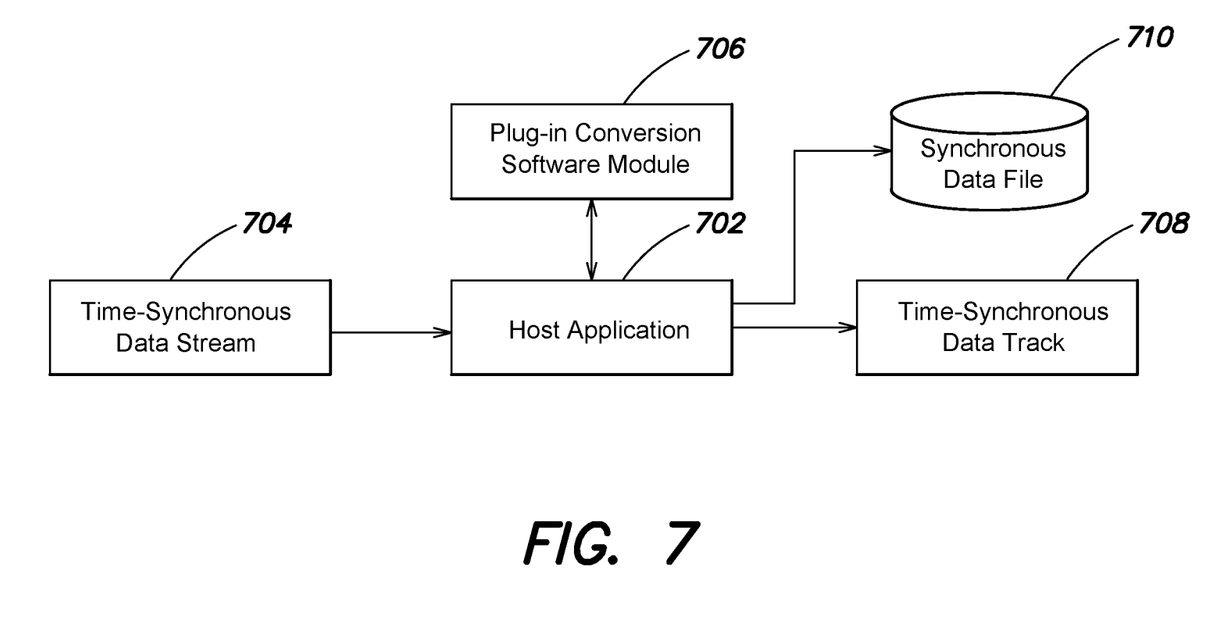
FIG. 7 is a high level block diagram illustrating the use of a plug-in software module for converting a time-synchronous data stream into a time-synchronous data track for viewing and editing with a host application.

We now describe workflows in which data contained within a synchronous data track is processed by the software plug-in to convert the data into a form that can be interpreted by a media processing application and displayed as a time-based data track within a timeline representation of a media project within a graphical user interface of the media processing application. The data is displayed in a manner that is time-synchronous, i.e., it is displayed in temporal alignment with the other time-based tracks displayed in the timeline, including the media (video and audio) tracks, and displays of other synchronous data tracks. Referring to FIG. 7, host application 702 (e.g., a non-linear digital video editing application) reads time-synchronous data stream 704, calls plug-in software module 706, which inputs the synchronous data stream 704. In general, synchronous data stream 704 is in a form that is opaque to the host application. For example, the synchronous data stream may have been created by extracting the ancillary portion from a digital video broadcast signal or from an audio broadcast signal. Such data can be read and displayed by a specialized device, such as a television set-top box, but would not be readable by a media processing application, such a non-linear video editing system. Plug-in 706 includes conversion software that converts the data in the time-synchronous data stream into a form that can be interpreted by the host application, while preserving the temporal information. The result of the conversion is time-synchronous data track 708. The host application may store the converted synchronous data track in association with the media composition to which it belongs so that it can be retrieved in subsequent media editing sessions without the need to repeat the conversion process. Typically, the media composition includes media data, non time-synchronous metadata, and potentially other time-synchronous data tracks belonging to the media composition. The converted data may be stored in the form of synchronous data file 710.

Figure 8:
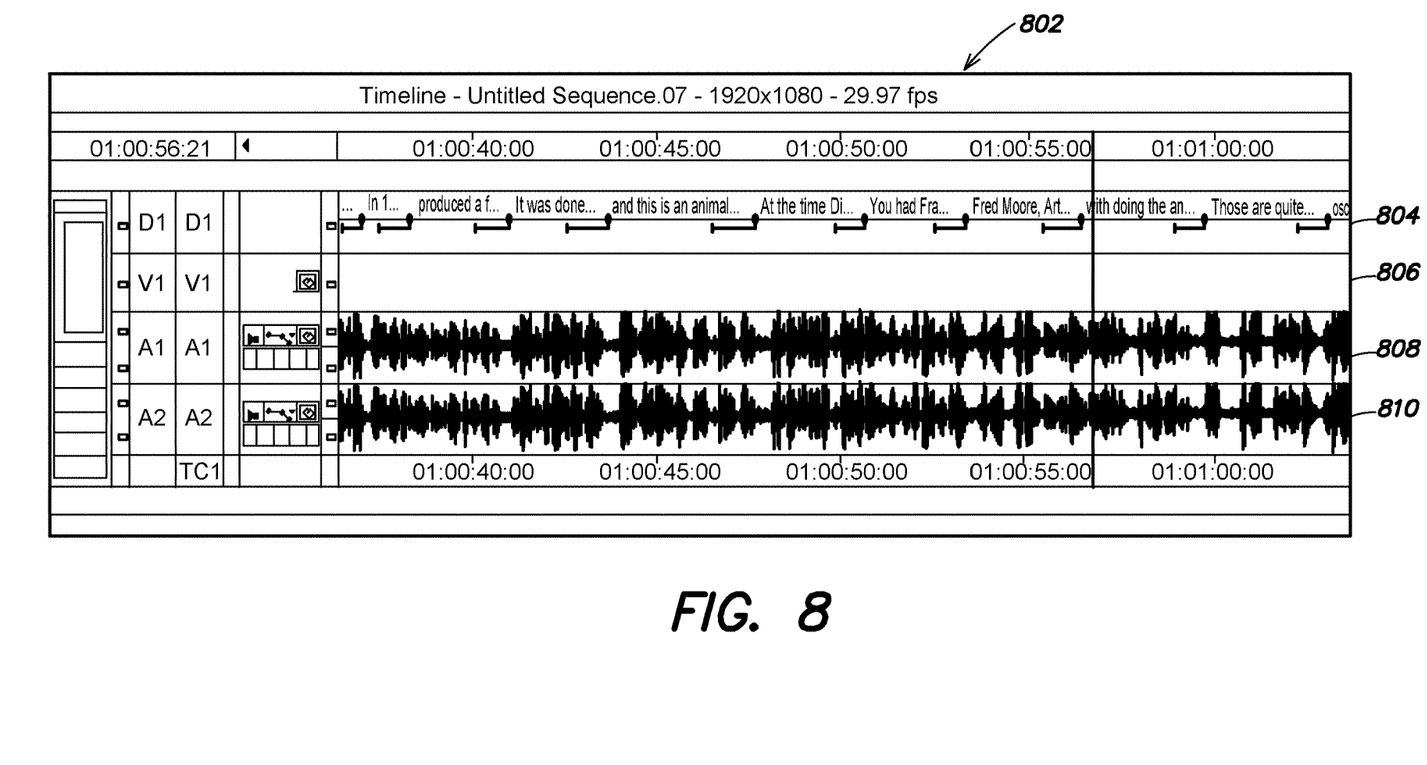
FIG. 8 is a schematic illustration of a user interface of a digital media editing system with a synchronous data track displaying temporally aligned data.

Time-synchronous data track 708 is displayed within the timeline of the host application 702. A portion of the graphical user interface of a non-linear video editing system is illustrated in FIG. 8, which shows schematic representation of a timeline 802 that includes time-synchronous data track 804, together with video track 806, and audio tracks 808 and 810. Synchronous data track 804 is populated with a time-synchronous representation of the data it contains, displayed in temporal alignment with the other time-based tracks. In the example illustrated, time progresses horizontally towards the right, and the various data, video and audio tracks represent data, video, and audio respectively that are temporally aligned. Thus data drawn on the time-synchronous data track at a particular horizontal coordinate is temporally synchronized with the video and audio content of the video and audio tracks at the same horizontal coordinate. In the example illustrated in FIG. 8, synchronous data track 804 represents closed captions, described in detail below. A media composition may include more than one synchronous data track, each of which may be converted and displayed in a time-synchronous manner. Thus, a timeline displayed within the graphical user interface of a media editing application may include an arbitrary number of synchronous data tracks, in addition to the time-based media tracks that represent video and audio. These synchronous data tracks may be derived from other kinds of ancillary data that may be extracted from a video stream, such as timecode, GPS data, and text or graphic station identifiers. Each of these may be displayed in a time-synchronous manner within a synchronous data timeline track of a media editing application.

We now describe the conversion and display of closed captions or subtitles previously extracted from the ancillary portion of a serial data stream. While television sets and set-top boxes typically include decoders for extracting and displaying closed caption data, digital media editing systems do not usually include a suitable decoder, rendering such data opaque to such systems. For NTSC standard broadcasts in the United States, Canada, and Mexico, the closed captions may be encoded using the EIA-608 and EIA-708 standards for closed captioning. The conversion process produces closed captions in text form, together with their associated timing information, enabling a digital media editing application to read the closed captions and to generate a user interface that allows a user to view and edit the closed captions or subtitles.

Referring again to the architecture shown in FIG. 7, time-synchronous data stream 704 may be an ANC stream of subtitle data, and is input by host application 702 which may be a non-linear video editing application such as MEDIA COMPOSER® from Avid Technology, Inc, Burlington, Mass. A user working on a media project that includes a closed-captioned video clip invokes a closed caption plug-in, for example by selecting a "show captions" menu option within the graphical user interface of the editing application. The editing application calls conversion software plug-in 706 to extract and convert the closed caption data from synchronous data stream 704. The encoded closed captioning packets in the stream, converts them into text, position, and type of caption for each frame. The extracted data is tagged with frame and time position information for each caption, and is used to generate synchronous data track 708 on a timeline display of the media project, with the data indicated on the track in a time-synchronous manner. The extracted and converted data may also be stored as part of the media project by the editing application as synchronous data file 710. The extraction and conversion process is only performed the first time the clip is edited or played back. During subsequent processing of the clip, the previously extracted and stored captions may be retrieved.

The caption text may be displayed within the synchronous data track, with the text drawn at a horizontal coordinate within the displayed data track of the timeline corresponding to the temporal location or offset of the closed caption within the media project. Other information about the caption stream may also be displayed in a time-synchronized manner on the synchronized data track. The extraction, conversion, and display of pop-on captions is described in detail below, but similar methods may be applied for roll-up or paint-on captions.

Figure 9A:
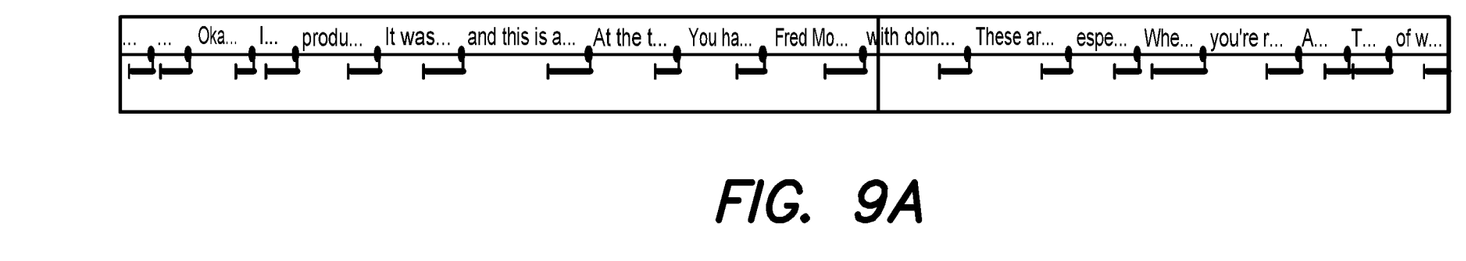
FIG. 9A is a diagrammatic representation of the synchronous data track of FIG. 8, showing a closed caption track displaying temporally aligned closed caption text, caption loading phases, and caption display time indicators.
Figure 9B:
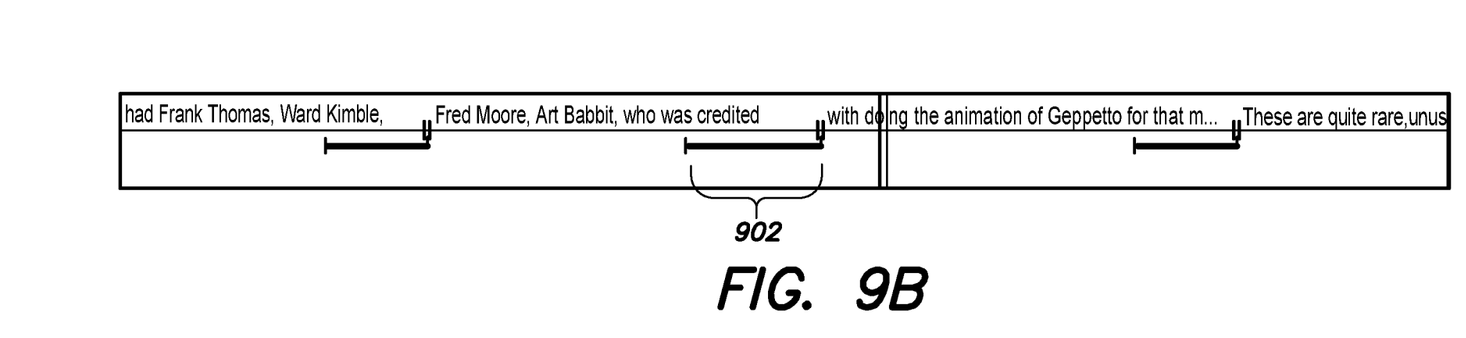
FIG. 9B is a temporally zoomed in portion of FIG. 9A.
Figure 9C:
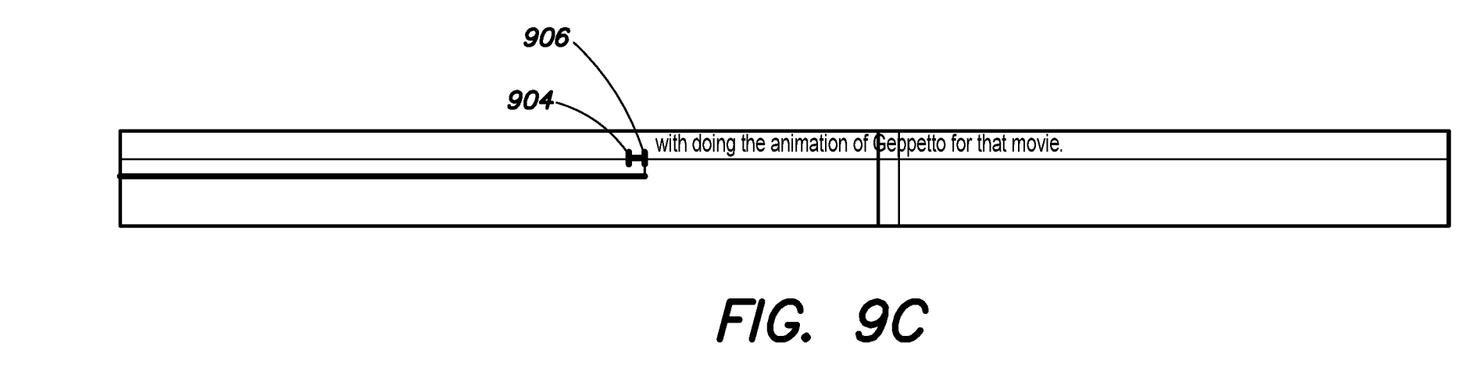
FIG. 9C is a temporally zoomed in portion of FIG. 9B.

FIGS. 9A, 9B, and 9C are diagrams illustrating successive zoom levels of a closed caption data track displayed as part of a timeline in the graphical user interface of a video editing application, such as track 804 shown in FIG. 8. Each caption has a loading phase, indicated in the illustrated caption track as a black bar, and a display phase. FIG. 9A, the most zoomed-out view, shows nearly twenty captions, with FIG. 9B showing in a zoomed in portion of the track around the playback line. For example, in FIG. 9B, loading phase 902 indicates the period during which ancillary caption data corresponding to the caption "with doing the animation of Gepetto for that movie" is loaded. Marker 904 (FIG. 9C) indicates the temporal location where the prior caption "Fred Moore, Art Babbitt, who was credited" is turned off, and marker 906 indicates the location where the next caption, which has now been loaded, is turned on. A given caption is displayed for the period indicated by the span between its turn-on marker and its turn-off marker. While a given caption is being displayed, the next caption loads. In certain caption styles, the turning off of a given caption at the end of its display period is immediately followed (i.e., in the next frame) by the turning on of the subsequent caption. In other caption styles, one or more blank frames are left between captions to cue the viewer to the caption change. The ancillary data stream corresponding to the portions that lie between loading phases generally include filler. Thus, the caption data track displayed within the timeline enables a user of the media editor to see which portions of the data track may be edited safely and which portions risk corrupting or losing caption data. The safe areas correspond to the portions between the loading phases marked by the black bars, while edits that span a portion of the marked loading phases are likely to cause caption display to fail in some manner. In order to flag this risk, an edit that spans a caption loading phase may be marked with a broken caption indicator on the displayed caption track, or the editing application may issue another kind of warning, such an audio alarm. The display of caption loading phases within the timeline assists editors not only with the editing of captions, but also with edits to any of the synchronous sound or picture tracks, since any such edits may also result in breaking a caption display. As shown in FIGS. 9A, 9B, and 9C, the text of the caption is displayed in a time-synchronous manner in the appropriate place in the timeline.

The conversion of the ancillary caption data stream into text makes captions searchable. When the user enters a search word or string, the media project is searched for occurrences of the search term within the captions, and, if instances are found, the media editing application is able to jump to the corresponding location within the timeline, and display the corresponding frame in a player window. Captions may also be stored and exported from the media editing application using formats such as Scenarist Closed Caption (SCC) or Timed-Text Markup Language (TTML), thus facilitating the caption track sharing, and enabling users of other media editing applications to view the captions. Caption export is also accomplished through the use of plug-in software modules.

Various types of synchronous data tracks may be converted into a form that allows searching, either directly within the media editing application, or within a media asset management system used to manage media projects. For example, data may be converted into text and read into a media asset management system, which can then be searched. Searchable data may include closed caption text, program description data, positional data such as GPS coordinates, and interactive program content. For example, a documentary or reality film maker may use GPS location data to search and sort available media based on the shoot locations.

Figure 10:
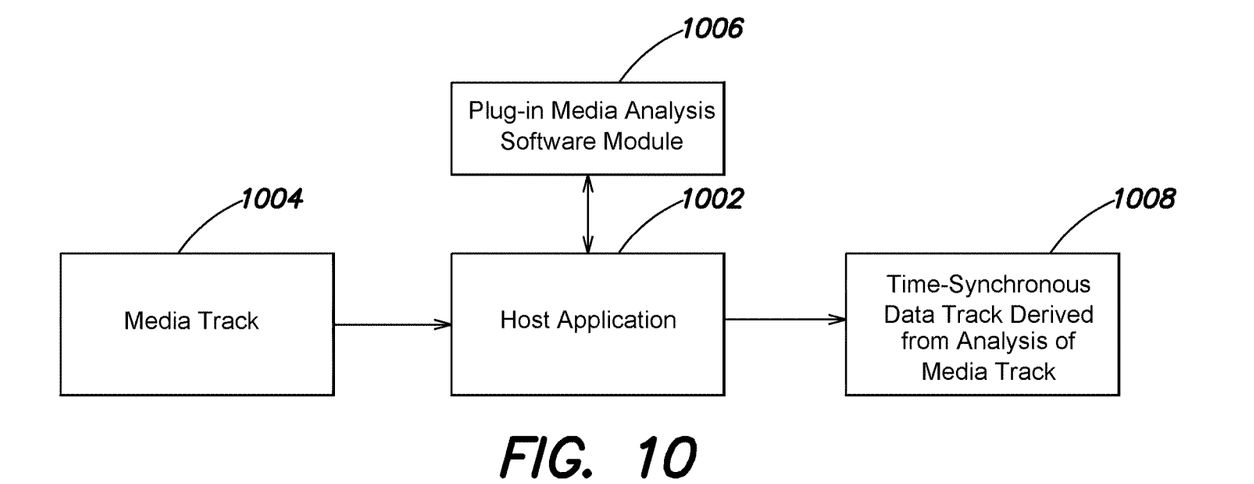
FIG. 10 is a high level block diagram illustrating the use of a plug-in software module to generate a time-synchronous data track using data from analysis of a media track.

Media analysis provides another example of the capabilities facilitated by the described plug-in-based framework for synchronous data. Referring to FIG. 10, host application 1002 reads media track 1004 (i.e., a video or audio track), calls media analysis software plug-in 1006, which inputs the media track for analysis. The results of the analysis are output to synchronous data track 1008, which may be displayed as a data track within the timeline of a graphical user interface of the host application. Synchronous data is displayed within the synchronous data track in temporal alignment with the other video, audio, and data time-based tracks of the media composition of which the media track forms a part.

Figure 11:
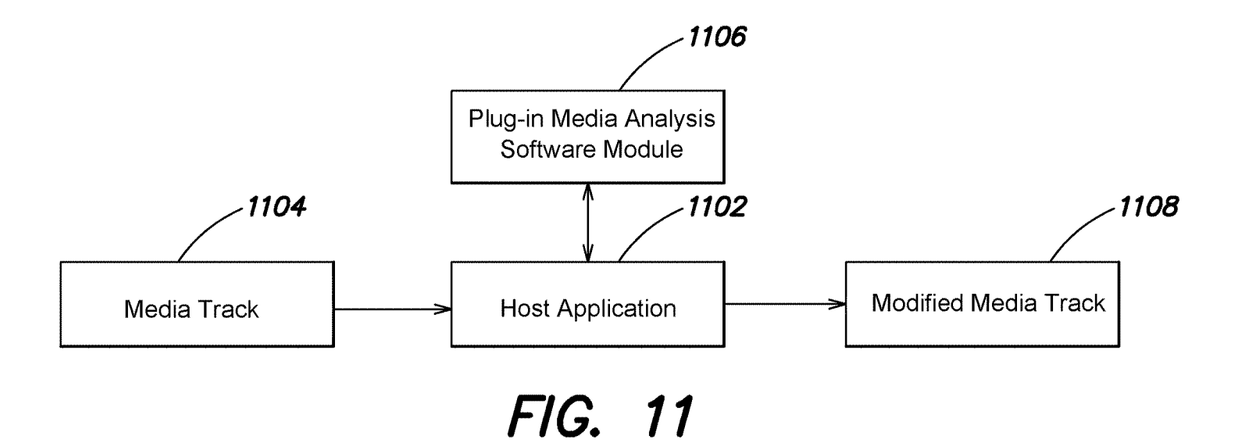
FIG. 11 is a high level block diagram illustrating the use of a plug-in software module to analyze a media track and use results of the analysis to generate a modified media track.

The media analysis results may also be used to create a modified media track, as shown in FIG. 11. Host application 1102 reads media track 1104, calls plug-in media analysis software module 1106, which analyses the media track to generate time-synchronous data. A text and/or graphical representation of the data derived from the media analysis is added to media track 1104 in a time-synchronous manner, and modified media track 1108 is generated and displayed in the timeline of a graphical user interface of host application 1102. For example, the analysis may produce motion vectors of an object identified in a video track, as described below. Such motion vectors may be used as a parameter to create an effect, such as a blur, that is applied in a time-synchronous manner to the identified object. Several kinds of media analysis together with the type of results for each kind of analysis are described below. Each of the result types may be represented as text, graphics, or an effect in a time-synchronous manner and combined or superimposed on media track 1104 as part of the generation of modified media track 1108.

Media analysis may extract data from video and audio that may be useful in the production process, or may be applied to a deliverable end product. Analysis workflows may involve the reading of a combination of synchronous data tracks and video tracks, and the generation of a combination of data tracks, media tracks, and data files that are to be stored. The results of the analysis performed by the analysis software plug-in may include one or both of synchronous data or non-synchronous data.

In an example of synchronous data results, a plug-in is used to analyze motion in a video stream, and to output motion vectors corresponding to motion identified within the video stream. The motion analysis may be restricted to a particular object, such as a person or animal, or to a region within a frame identified by a user. The results of the analysis are output to a synchronous data stream, which is displayed as a synchronous data track within a timeline of the graphical user interface of the host application. The synchronous data track includes a display of the motion vectors that are temporally synchronized on the timeline with the other displayed media and/or synchronous data tracks. For example, arrows indicating motion vectors may be plotted on a motion synchronous data track in temporal alignment with the video from which the motion vectors were derived. Thus, if at a temporal offset from the beginning of a clip of t seconds, a tracked object moves at a velocity v, a motion vector in the data track having a direction and magnitude corresponding to v is drawn in the data track at a temporal offset oft seconds from the beginning of the track.

Other analysis examples implemented via corresponding plug-ins include: analysis of speech audio tracks to generate a corresponding synchronous phoneme track or text track; detection of faces with generation of synchronous and/or non-synchronous indications of the presence of a face and, optionally face identification; assessment of the quality of media on a track, and generating corrected media tracks; detecting location in a sound track by identifying ambient sounds; detecting location in a picture track by identifying features within the pictured scene; and automatic key framing and edit point detection in each track via associated sound, video, or data. Each data type that results from analysis of a media track may be converted into its own synchronized data track, with a time-synchronized graphical or textual indication of the analysis results displayed within the synchronous data track on a timeline. A wide variety of data formats, standards, and syntaxes may be processed flexibly via the use of specifically tailored plug-ins.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data such as ancillary data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media and data may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a physical memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of processing a time-synchronous ancillary data stream comprising a plurality of data packets, each packet including a payload portion, wherein the data stream is associated with a time-based media project, the method comprising:

reading the time-synchronous ancillary data stream into a media processing application;

from the media processing application, calling a first software plug-in module;

enabling the first software plug-in module to access and process the time-synchronous ancillary data stream, the processing comprising converting the time-synchronous data stream into a first time-synchronous data track that is readable by the media processing application;

displaying the first time-synchronous data track within a timeline representation of the time-based media project within a graphical user interface of the media processing application, wherein the timeline representation includes a first media track comprising a plurality of media clips; and wherein:

the first time-synchronous data track is populated with a temporally aligned display of content extracted from a payload portion of packets of the time-synchronous data stream;

the temporal alignment of the display of content includes alignment of the displayed content with a temporal offset to which it corresponds within the plurality of media clips of the first media track; and a user of the media processing application is able to view in the first time-synchronous data track a content of the time-synchronous data that would be affected by a time-based edit performed within a media clip of the first media track and specify a temporal location of the time-based edit within the media clip based at least in part on viewing in the first time-synchronous data track the content of the first time-synchronous data track that would be affected by the time-based edit.

2. The method of claim 1, wherein the time-synchronous data stream was extracted from an ancillary portion of a digital video broadcast signal.

3. The method of claim 2, wherein the time synchronous data stream includes timecode data and the representation of content of the data stream includes a numerical timecode.

4. The method of claim 2, wherein the time synchronous data stream includes GPS data and the representation of content of the data stream includes an indication of a change in GPS coordinates between a first temporal location and a second temporal location within the time-synchronous data stream.

5. The method of claim 2, wherein the time synchronous data stream includes at least one of a text and a graphical station identifier and the representation of content of the data stream includes a text or a graphical indication of the at least one of a text and a graphical station identifier.

6. The method of claim 1, wherein the time-synchronous data stream includes closed caption data.

7. The method of claim 6, wherein the representation of content of the data stream includes closed caption text.

8. The method of claim 6, wherein the closed caption data is searchable.

9. The method of claim 6, further comprising displaying within the timeline:

an indication of a temporal location at which a display of a given closed caption is to be turned off during playback of the time-based media project; and an indication of a temporal location at which a closed caption subsequent to the given closed caption is to be turned on during playback of the time-based media project.

10. The method of claim 6, further comprising displaying within the timeline an indication of a plurality of closed caption loading phases corresponding to temporal spans within the time-synchronous data stream during which closed caption data is present.

11. The method of claim 6, further comprising displaying a broken caption warning within the timeline representation of the first time-synchronous data track when a user of the media processing application performs an editing operation at a temporal location in the time-based media project that spans a temporal location within the time-synchronous data stream during which closed caption data is present in the time-synchronous data stream.

12. The method of claim 6, further comprising exporting from the media processing application closed caption text obtained from the closed caption data.

13. The method of claim 1, wherein:

the first media track is associated with a media project; and the media project includes a second media track; and further comprising:

reading the second media track into the media processing application;

from the media processing application, calling a second software plug-in module;

enabling the second software plug-in module to access and analyze the second media track to generate time-based analysis results;

generating a second time-synchronous data track comprising time-synchronous analysis results; and displaying the second time-synchronous data track within the timeline representation of the time-based media project within the graphical user interface of the media processing application, the second time-synchronous data track including a temporally aligned display of the time-synchronous analysis results such that a representation of time-synchronous analysis results associated with a given temporal location within the second media track is displayed in the second time-synchronous data track timeline representation at a spatial location corresponding to the given temporal location.

14. The method of claim 13, wherein analyzing the second media track includes detecting motion within a video track and the time-based analysis results include motion vectors.

15. The method of claim 13, wherein analyzing the second media track includes analyzing a speech audio track and the time-based analysis results include at least one of phonemes and text.

16. The method of claim 13, wherein analyzing the second media track includes detecting faces within a video track and the time-based analysis results include face identification.

17. The method of claim 13, wherein analyzing the second media track includes assessing a technical quality of the second media track, and the time-based analysis results include evaluations of the technical quality of the second media track.

18. The method of claim 13, wherein analyzing the second media track includes identifying ambient sounds within a sound track and the time-based analysis results include location detection.

19. The method of claim 13, wherein analyzing the second media track includes identifying features within a pictured scene in a video track and the time-based analysis results include location detection.

20. A system comprising:
a memory for storing computer-readable instructions; and
a processor connected to the memory, wherein the processor, when executing the computer-readable instructions, causes the indexing system to perform a method of processing a time-synchronous ancillary data stream associated with a time-based media project, the method comprising:
reading the time-synchronous ancillary data stream into a media processing application;
from the media processing application, calling a software plug-in module;
enabling the software plug-in module to access and process the time-synchronous ancillary data stream, the processing comprising converting the time-synchronous data stream into a time-synchronous data track that is readable by the media processing application;
displaying the time-synchronous data track within a timeline representation of the time-based media project within a graphical user interface of the media processing application, wherein the timeline representation includes a media track comprising a plurality of media clips; and wherein:
the time-synchronous data track is populated with a temporally aligned display of content extracted from a payload portion of packets of the time-synchronous data stream;
the temporal alignment of the display of content includes alignment of the displayed content with a temporal offset to which it corresponds within the plurality of media clips of the media track; and
a user of the media processing application is able to view in the data track a content of the time-synchronous data that would be affected by a time-based edit performed within a media clip of the media track and specify a temporal location of the time-based edit within the media clip based at least in part on viewing in the data track the content of the time-synchronous data track that would be affected by the time-based edit.

21. A computer program product comprising:
a non-transitory computer-readable medium with computer program instructions encoded thereon, wherein the computer program instructions, when processed by a computer system, instruct the computer system to perform a method of processing a time-synchronous ancillary data stream associated with a time-based media project, the method comprising:
reading the time-synchronous ancillary data stream into a media processing application;
from the media processing application, calling a software plug-in module;
enabling the software plug-in module to access and process the time-synchronous ancillary data stream, the processing comprising converting the time-synchronous data stream into a time-synchronous data track that is readable by the media processing application;
displaying the time-synchronous data track within a timeline representation of the time-based media project within a graphical user interface of the media processing application, wherein the timeline representation includes a media track comprising a plurality of media clips; and wherein:
the time-synchronous data track is populated with a temporally aligned display of content extracted from a payload portion of packets of the time-synchronous data stream;
the temporal alignment of the display of content includes alignment of the displayed content with a temporal offset to which it corresponds within the plurality of media clips of the media track; and
a user of the media processing application is able to view in the data track a content of the time-synchronous data that would be affected by a time-based edit performed within a media clip of the media track and specify a temporal location of the time-based edit within the media clip based at least in part on viewing in the data track the content of the time-synchronous data track that would be affected by the time-based edit.

* * * * *